Patented Mar. 19, 1935

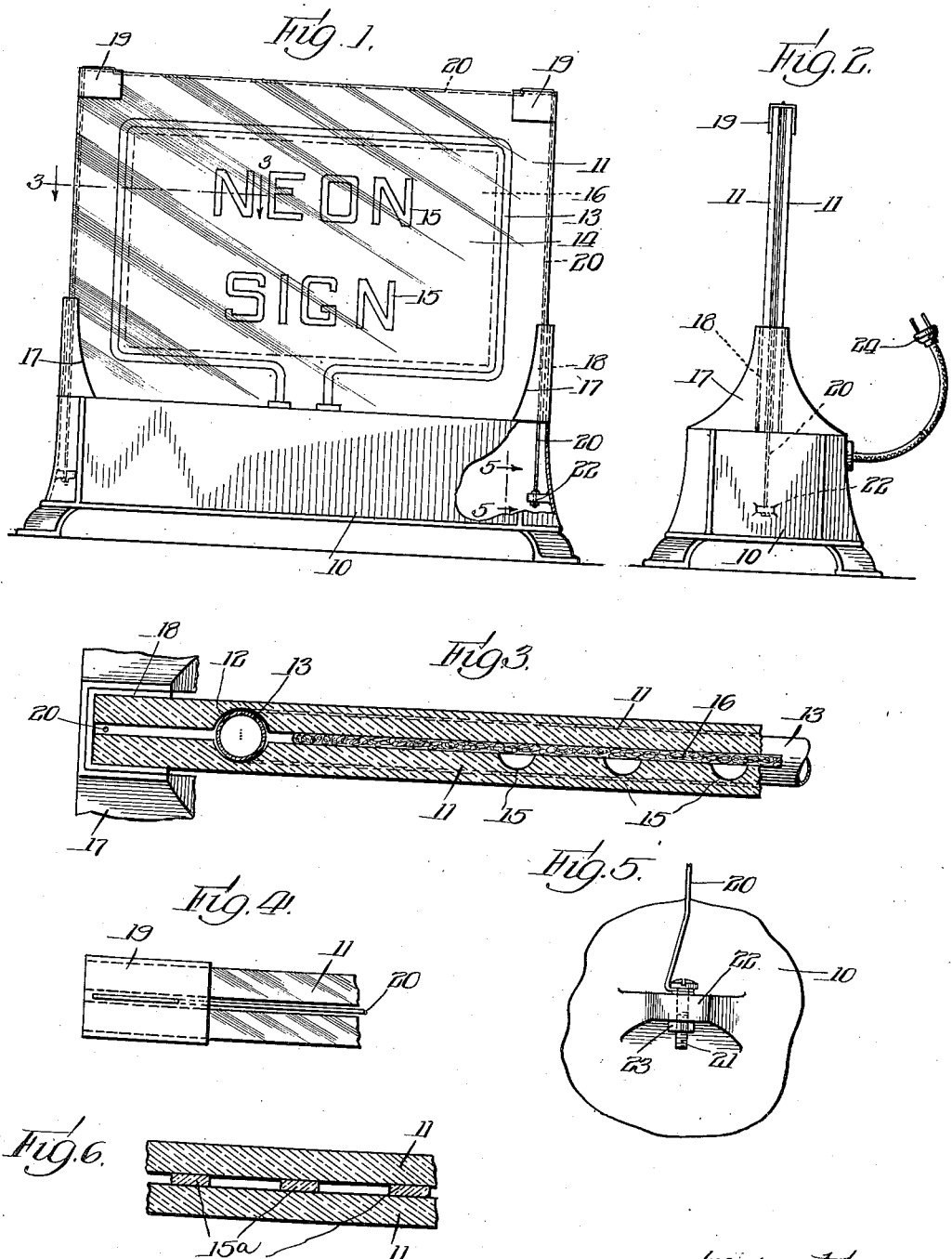

1,994,519

UNITED STATES PATENT OFFICE 1,994,519

SIGN

George Samuel James, Chicago, Ill., assignor, by mesne assignments, to Albert F. Spitzglass, Chicago, Ill.

Application October 18, 1930, Serial No. 489,624

13 Claims. (Cl. 40—130)

The invention relates to advertising signs, and its general object is to provide a novel sign illuminated by electrically-operated gas-filled tubes and bearing an advertising legend formed by means adapted to reflect the light from the tubes so that the legend has an apparent illumination.

More specifically, the object is to provide a sign comprising an illuminating tube such as a neon tube mounted on a transparent plate and extending around the plate so as to define a panel, means for diffusing the light of the tube passing directly through the plate, and an advertising legend formed within the panel in such a manner as to reflect light from the tube and to stand out prominently to the eye of an observer.

Another object is to provide a sign of this character which is adapted to be detachably connected to a lighting circuit of the usual voltage, which is compact and attractive in appearance and adapted to rest on a counter, show-case, table or the like.

Other objects and advantages will become apparent from the following description taken in connection with the accompanying drawing, in which:

Figure 1 is a front elevation, partly in section, of a sign embodying the features of the invention.

Fig. 2 is an end elevation of the sign.

Fig. 3 is an enlarged fragmentary section taken along the line 3—3 of Fig. 1.

Fig. 4 is an enlarged fragmentary plan view of the upper edge of the sign.

Fig. 5 is an enlarged fragmentary view taken on the line 5—5 of Fig. 1.

Fig. 6 is an enlarged fragmentary section showing a modified form of legend.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The present embodiment of the invention comprises briefly a base, a pair of transparent plates supported by the base and having complementary grooves cut in their adjacent faces forming a tubular channel through which an electrically-operated gas-filled illuminating tube extends, an advertising legend inscribed on the plates and illuminated by the tube, means for clamping the plates together, and means for connecting the tube to a current supply.

As shown in the drawing, the base comprises a box-like structure 10 whose external surfaces may be decorated to present an attractive appearance. Supported by the base is a pair of transparent plates 11 made of clear glass or the like bearing a face-to-face relation. Formed on the adjacent faces of the plates 11 are complementary grooves 12, the groove in each plate being substantially semi-circular in cross section in order to form a tubular channel within which is mounted an electrically operated gas-filled illuminating tube 13, such as a neon tube.

The grooves 12 preferably extend around the plates 11 in a manner to form a panelled portion 14 on the plates, the ends of the grooves 12 leading to a point immediately adjacent the base so that the tube 13 may extend into the base. Within the panelled portion 14, an advertising legend 15 is inscribed.

The invention aims to provide a legend which shall stand out prominently to the eye of an observer in order to give the sign its advertising value. The tube 13 when operating would be the most prominent part of the sign, unless its light were diffused. Then reflection of the light by the legend will cause the latter to appear illuminated and to stand out prominently.

For this reason, means is preferably provided to diffuse the light from the tube which passes directly through the plate. This means is obtained preferably by cutting the grooves by a sand-blast which leaves a roughened translucent surface softening the light coming directly from the grooved portion of the plates to the eye of the observer. The legend is preferably inscribed on the rear face of the front plate by means forming characters on the glass, such as substantially semi-circular grooves cut in the glass by a sand-blast, as shown in Fig. 3, or by applying decalcomania or ground glass characters 15a to the rear face of the front plate, as shown in Fig. 6. If the characters are cut in the glass by a sand-blast, it is preferable to cut them deeply. Thus, their surfaces reflect light from the tube 13, and they appear to be illuminated to an extent equal to apparent illumination of the grooved portion of the plates. The part of the plates not occupied by the grooves or the legend being clear, practically no light is reflected therefrom to the eye so that a suitable background for the legend is provided thereby.

In order to make the sign more attractive, a colored material 16, such as brightly colored felt, may be interposed between panelled portions 14 of the plates. This material gives a background to the advertising legend and when the tube is operating makes the legend more prominent.

To clamp the plates 11 closely together, the base has a pair of uprights 17 formed on its ends and supporting channel members 18 which extend up along the end edges of the plates. At the top, the plates are held together by a pair of U-shaped clamps 19 fitting over the upper edges of the plates at the respective ends thereof. To hold the clamps 19 securely in place, a wire 20 passes from one end of the base up between the plates adjacent the side edge thereof, through holes in the middle portion of one clamp 19, then between the upper edges of the plates, through holes in the other clamp 19, and down between the other side edges of the plates to the base. In the base, the ends of the wire are adjustably secured as by wrapping them around the headed ends of screws 21. The screws 21 pass through lugs 22 formed on the inside of the respective ends of the base and have nuts 23 threaded onto their lower ends in abutment with the lugs 22.

For connecting the tube 13 into a circuit, the necessary connections, etc. may be mounted within the base, and a standard attachment plug 24 is attached to the end of a cord extending from the rear face of the base for connecting the device to a current supply. If transformers are required to step up the voltage for the tube 13, they may be mounted within the base.

From the above description, it will be apparent that I have provided a novel sign bearing an advertising legend which is prominently brought to the attention of passers-by through the medium of the light supplied by the illuminating tube and diffused over the panelled surface upon which the legend is inscribed and reflected by the legend to give it prominence. It is also apparent that I have provided a novel sign adapted to rest on a show-case, table, or the like, and which is compact and attractive in appearance.

I claim as my invention:

1. A sign of the character described comprising, in combination, a pair of glass plates supported in a face-to-face relation and closely adjacent each other, each plate having a substantially semi-circular groove cut therein and forming with the groove in the other plate a tubular channel extending around said plates, an electrically-operated gas-filled illuminating tube extending through said channel, and means constituting an advertising legend and adapted to reflect the light from said tube.

2. A sign of the character described comprising, in combination, a pair of transparent plates supported in a face-to-face relation, an electrically-operated gas-filled illuminating tube extending between said plates, means formed on said plates adjacent said tube partially reflective and partially translucent to the light therefrom, and means formed on one of said plates and adapted to reflect the light from said tube and to have an apparent illumination to give prominence thereto.

3. A sign of the character described comprising, in combination, a pair of clear glass plates supported in face-to-face relation, an electrically-operated gas-filled illuminating tube extending between said plates, means formed on said plates adjacent said tube for diffusing the light thereof, and means on one of said plates forming characters constituting an advertising legend for reflecting light from said tube to effect an apparent illumination of the characters.

4. A sign of the character described comprising, in combination, a pair of clear glass plates supported in a face-to-face relation having complementary grooves sand-blasted in their adjacent faces and forming a tubular channel, an electrically-operated gas-filled illuminating tube extending through said channel, the sand-blasted surfaces of said grooves diffusing the light from said tube, and characters constituting an advertising legend sand-blasted into the rear face of the front plate, the sand-blasted surfaces of said characters reflecting light from the tube.

5. A sign of the character described comprising, in combination, a pair of clear glass plates supported in a face-to-face relation, an electrically-operated gas-filled illuminating tube extending between said plates, and ground glass characters positioned between the plates and in contact with the adjacent faces of the plates for reflecting light from the tube.

6. A sign of the character described comprising, in combination, a pair of glass plates supported in a face-to-face relation closely adjacent each other, said plates having grooves cut in the adjacent faces constituting a tubular channel forming a panelled portion on the plates, an electrically-operated gas-filled illuminating tube extending through said tubular channel, means for connecting said tube to a current supply, a colored material interposed between the panelled portions of said plates, and an advertising legend inscribed on the front plate within the panelled portion and illuminated by said tube.

7. A sign of the character described comprising, in combination, a base, a pair of glass plates supported by said base in a face-to-face relation and having grooves cut in their adjacent faces, an electrically-operated gas-filled illuminating tube extending from said base in said grooves, means for connecting said tube to a current supply, and means for clamping said plates closely together comprising a pair of channel members extending upwardly from said base along the end edges of the plates, a pair of U-shaped clamps fitting over the upper edges of said plates at the respective ends thereof, and a wire passing through holes in said clamps and having its ends adjustably secured in the base to hold said clamps in their clamping position.

8. A display sign having in combination, a base, a plurality of display plates, at least one of which is light transmitting, a pair of guide members associated with said base for supporting said plates above said base, a discharge tube for illuminating said light transmitting plate, clamping members fitting the edges of said plates and spaced therearound, a cable cooperating with said clamps for holding said clamps in clamping position and adjustable means to tension said cable to vary the clamping action of said clamps.

9. A display sign having in combination a base, a pair of display plates arranged in parallel relation above said base, a pair of members extending upwardly from said base and cooperating with said plates to maintain them in position, an electrical discharge tube for emitting radiations whereby to illuminate advertising legends delineated on said plates, spaced members for holding said plates in position, a cable cooperating with said members and having its ends anchored to said base to hold said members in engagement with said plates, and adjustable means for varying the tension of said cable.

10. A sign of the character described comprising, in combination, a transparent plate supported in an upright position and having a groove formed in the rear face thereof, an electrically operated gas-filled illuminating tube positioned within said groove, and a sand-blasted display area forming a recess in the plate, the surfaces of said recess being adapted to reflect the light from said tube.

11. A sign of the character described, comprising, in combination, a pair of glass plates supported in face-to-face relation and closely adjacent each other, each plate having a substantially semicircular groove cut therein and forming with the groove in the other plate a tubular channel extending around said plates, an electrically operated gas-filled illuminating tube extending through said channel, and means constituting a display area sand-blasted into at least one of the plates and adapted to reflect the light from said tube.

12. A sign of the character described, comprising, in combination, a pair of clear glass plates supported in face-to-face relation having complementary grooves sand-blasted into their adjacent faces and forming a tubular channel, an electrically-operated gas-filled illuminating tube extending through said channel, the sand-blasted surfaces of said grooves diffusing the light from said tube, and characters constituting an advertising legend sand-blasted into the rear face of the front plate, the sand-blasted surfaces of said characters reflecting light from the tube.

13. A sign of the character described, comprising, in combination, a pair of clear glass plates supported in face-to-face relation having complementary grooves sand-blasted into their adjacent faces and forming a tubular channel, an electrically-operated gas-filled illuminating tube extending through said channel, the sand-blasted surfaces of said grooves diffusing the light from said tube, and a display area sand-blasted into at least one of said plates to form a recess therein, the sand-blasted surfaces of said recess reflecting light from the tube.

GEORGE SAMUEL JAMES.